United States Patent [19]

Daviet et al.

[11] Patent Number: 5,139,425
[45] Date of Patent: Aug. 18, 1992

[54] ROLLING BEARING WITH ROTATING ELECTRICAL CONTACTS

[75] Inventors: Bernard Daviet, Bailly; Claude Lamy, Les Loges en Josas; Michel Descombes, Versailles, all of France

[73] Assignee: SKF France, Clamart Cedex, France

[21] Appl. No.: 756,229

[22] Filed: Sep. 9, 1991

[30] Foreign Application Priority Data

Sep. 13, 1990 [FR] France ............... 90 11318

[51] Int. Cl.[5] ............................ H01R 39/40
[52] U.S. Cl. .................... 439/17; 277/901; 384/477
[58] Field of Search .................... 439/17–23, 439/27–30, 34; 277/152, 153, 95, 901; 384/277, 476, 477

[56] References Cited

U.S. PATENT DOCUMENTS

| | | | |
|---|---|---|---|
| 3,216,262 | 11/1965 | Swarts et al. | 439/28 |
| 3,564,477 | 2/1971 | Pompei | 439/17 |
| 4,336,974 | 6/1982 | Wilson | 439/13 |

FOREIGN PATENT DOCUMENTS

2030470 2/1971 Fed. Rep. of Germany ...... 277/901

Primary Examiner—Gary F. Paumen
Attorney, Agent, or Firm—Beveridge, DeGrandi & Weilacher

[57] ABSTRACT

The rolling bearing with rotating electrical contacts comprises inner (7, 8) and outer (2) races gripping around the rolling elements (5, 6) and is equipped with means permitting the passage of an electrical current between two mechanical components, of which one is rotationally moveable in relation to the other. For this purpose at least one conductive cartridge (21) of generally annular form is mounted substantially in a frontal radial plane of the bearing, the said cartridge comprising two conductive armatures (22, 23), one being able to rotate in relation to the other, each armature being integral with one of the races of the rolling mechanism and at least one conductive element (29) pressed against one of the armatures (22) by at least one conductive elastic element (27) in contact with the other armature (23).

13 Claims, 3 Drawing Sheets

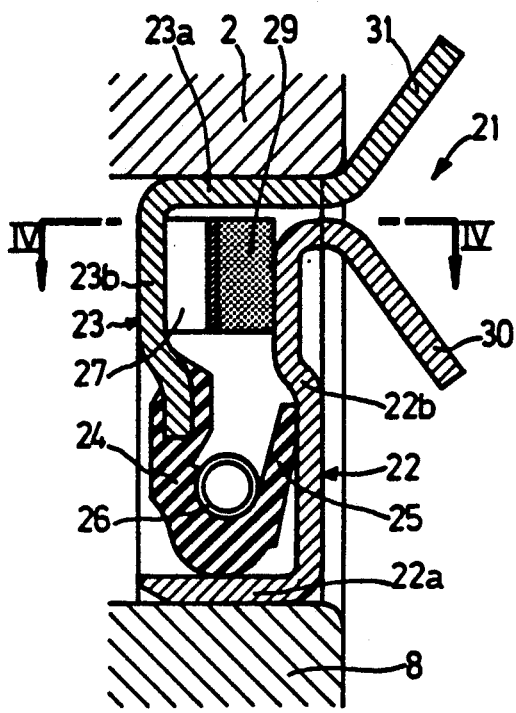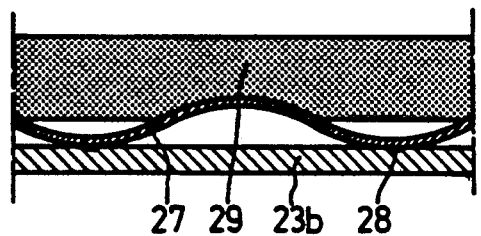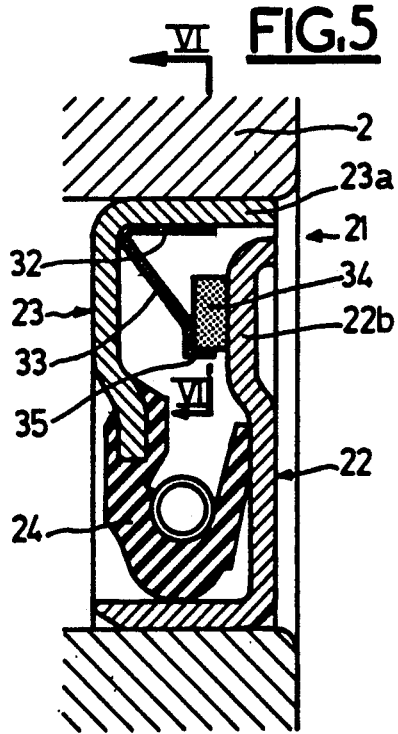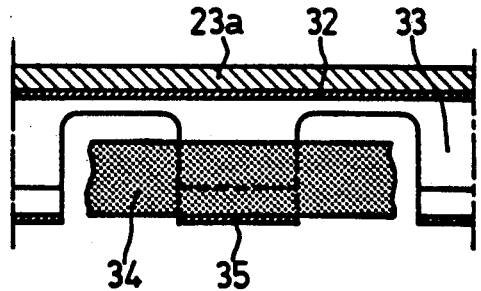

ROLLING BEARING WITH ROTATING ELECTRICAL CONTACTS

The present invention relates to a rolling bearing comprising rotating electrical contacts intended to cause electrical current to be passed between two mechanical components, one of which is rotationally movable in relation to the other.

Generally when it is desired to cause an electric current to be passed between a mechanical component which is fixed and a mechanical component which rotates, use is made of carbons or carbon brushes integral with a first component bearing on a collector ring, generally made of copper or a copper alloy, integral with the second component which rotates in relation to the first. When the rotary component is supported by a rolling bearing, the rotating electrical contacts are generally assemblies separated and insulated electrically from the rolling bearings. Thus, for example, in the case of an alternator the shaft of the rotor is mounted on rolling bearings disposed close to each end of the shaft. Between these two bearing mechanisms and close to one of the ends of the shaft are disposed two collector rings made of copper which are integral with the rotor. One or more carbons are radially disposed in contact with each collector ring against which the carbons rub.

Such an arrangement exhibits several disadvantages because of the utilization of separate elements in order to provide, on the one hand, the function of support by rolling bearing and, on the other hand, the function of transmitting the electrical current. The result of this, in fact, is a multiplicity of parts to be assembled and a dispersing of these parts in the machine to be assembled. In addition, as a result the axial dimension is quite large.

A rolling bearing assembly equipped with rotating electrical contacts attached axially in the extension of the bearing is known from the U.S. Pat. No. 3,216,262 (SWARTS). This too involves a device which is complex and particularly bulky, especially in the axial direction.

In some industries, such as the aeronautical and automobile industries, it is moreover increasingly necessary to transmit electrical currents or information in the form of electrical signals between fixed elements and rotating elements in order, for example, to take measurements of pressure, speed, temperature or other operating characteristics. The space available for the means for transmitting these electrical signals is increasingly restricted.

A rolling bearing, in which transmission of the electrical current is carried out directly by means of rolling tracks and rolling elements, is known from the French Utility Certificate 2,124,728 (RIV-SKF). Such a device, however, may not be utilized except in certain applications for which the passage of the current is only brought about during a short period and/or the current is of low intensity. There occur in fact, close to the points of contact, electrical micro-arcs liable to damage in the long term the rolling tracks and the rolling elements.

The object of the present invention is to eliminate these disadvantages of the prior art and to propose a rolling bearing comprising means for transmitting the electrical current, even of high intensity, having the form of a compact assembly comprising but a few parts to be manipulated and which can be utilized in a space of very reduced size.

The object of the invention is also to integrate in a rolling bearing rotating means of electrical contact in the form of a single assembly providing simultaneously the function of rolling bearing and the function of rotating electrical contact.

The rolling bearing with rotating electrical contacts according to the invention comprises inner and outer races between which are disposed rolling elements, the said bearing being equipped with means permitting the passage of an electrical current between two components, one of which is rotationally movable in relation to the other. According to the invention, at least one conductive cartridge of generally annular form is mounted between the races of the bearing mechanism in a radial plane, for example in a frontal radial plane of the bearing, the said cartridge comprising two conductive armatures, one being able to rotate in relation to the other. Each armature is integral with one of the bearing races and at least one conductive element is pressed against one of the armatures by at least one conductive elastic element in contact with the other armature.

The conductive element may be constituted by a ring or by segments made of carbon and may be pressed axially or radially against the armature with which it comes into contact.

The conductive elastic element is preferably fixed to the armature with which it is in contact. The conductive elastic element may be constituted by a crinkle washer or a ring equipped with elastic support teeth for the conductive element.

The armatures of the cartridge which are constructed from a conductive material such as stainless steel, for example, comprise connection means with conductive leads for input and output of the current. These connection means may be advantageously constituted by at least one blade terminal integral with each armature and obtained by a cutting out operation.

The armatures may also advantageously serve as a support and a seating for a frictional sealing ring, insulating the bearing mechanism from the external medium.

In an embodiment of the invention, the races of the bearing and the rolling elements are constructed from an electrically conductive material. Electrical insulation means are interposed between the armatures and the races of the bearing, the input and the output of the electrical current being brought about by the blade terminals with which the armatures of the conductive cartridge are equipped. The electrical insulation may be obtained by providing a layer of insulating material on the surfaces of the armatures or of the races of the bearing which are in respective contact.

In another embodiment, the races of the bearing and/or the rolling elements are constructed in such a manner as not to conduct electricity. For this purpose an insulating material such as ceramic may be utilized or only a superficial insulating deposit made of ceramic, rubber etc. may be provided on the surfaces of the parts in contact. The conductive cartridge is then in direct contact with the two races of the bearing.

When the rolling elements are constructed in such a manner as not to conduct electricity while the races of the bearing themselves are electrically conductive, a layer of insulating material is advantageously provided on the outer surface of the outer race of the bearing and in the bore of the inner race. The conductive cartridge may be put into direct contact with the two races of the bearing, the input and the output of the current then being brought about by the blade terminals of the armatures of the conductive cartridge.

As a variant, when the rolling elements are not conductive, the input and the output of the electrical current may be brought about directly by the races of the bearing.

The invention will be better understood by studying a detailed description of a few embodiments, given by way of examples which are not at all limiting, and which are illustrated by the attached drawings in which:

FIG. 3 is an enlarged view in partial cross-section of the conductive cartridge equipping the rolling bearing of FIG. 1;

FIG. 4 is a cross-section according to IV—IV of FIG. 3 and developed;

FIG. 5 is an enlarged view of an alternative form of construction, in partial cross-section analogous to FIG. 4 and FIG. 6 is a view in cross-section according to VI—VI of FIG. 5 and developed.

Figure 1:
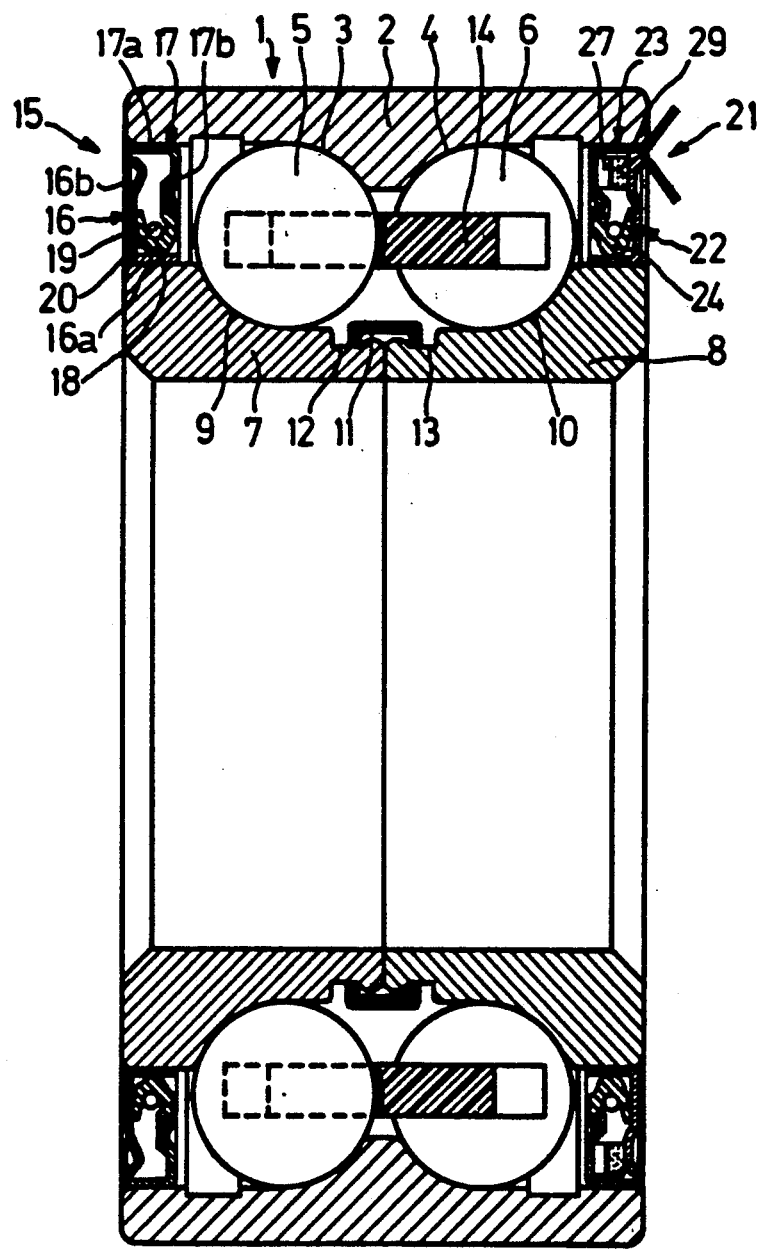
FIG. 1 is a cross-sectional view of a rolling bearing with rotating electrical contacts according to the present invention.
Figure 2:
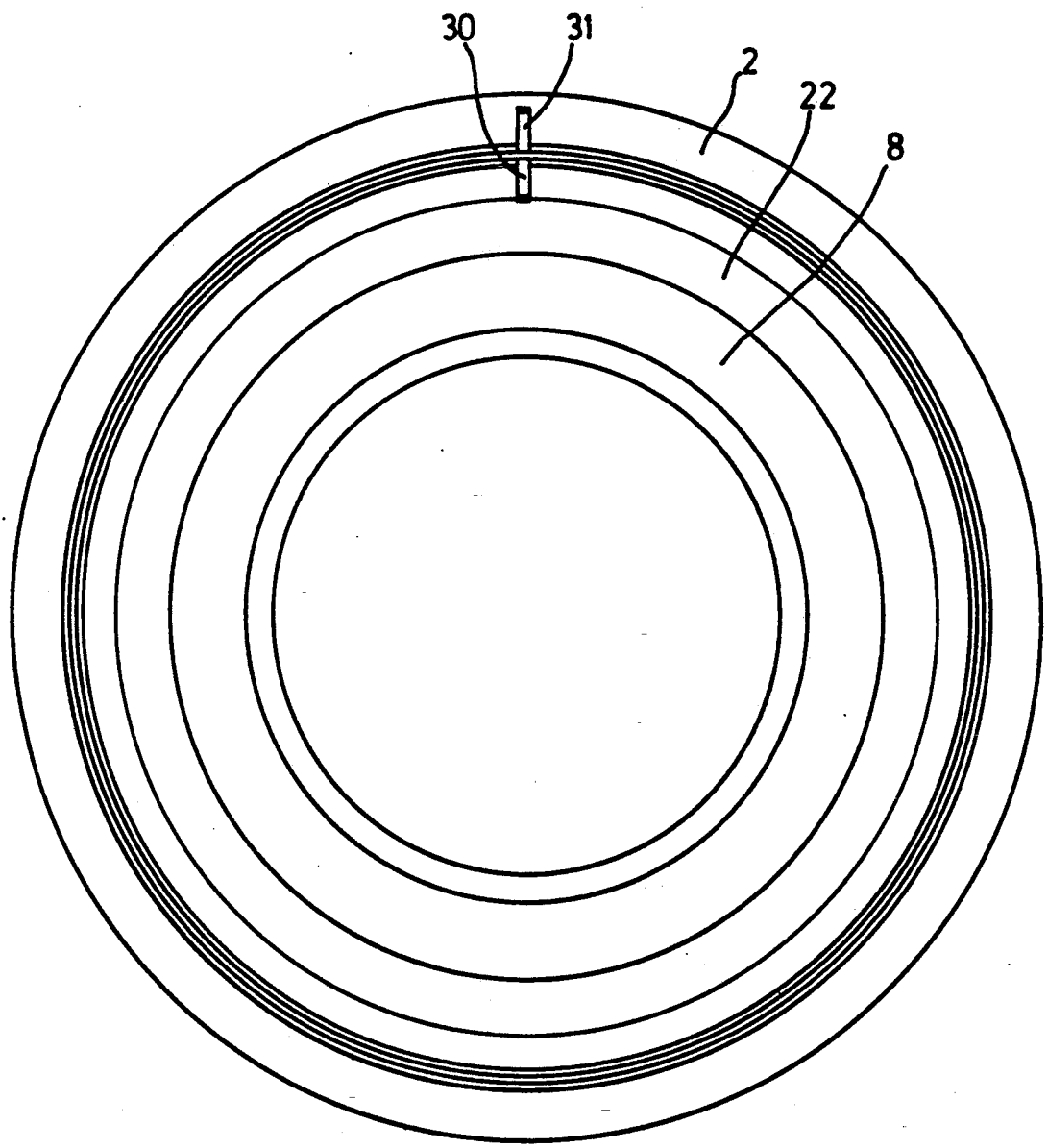
FIG. 2 is an external view from the right of FIG. 1.

As FIGS. 1 to 4 illustrate, the rolling bearing of the invention, designated 1 in its entirety, is a bearing of conventional structure having a double row of balls in oblique contact. The rolling bearing 1 comprises an outer race 2 exhibiting two rolling tracks 3, 4 for the two rows of balls 5, 6. The rolling bearing 1 also comprises two inner half-races 7, 8 each comprising a raceway 9, 10 for the balls 5, 6. The two inner half-races 7, 8 are rigidly held together by an annular clip 11 which engages with grooves 12, 13 machined on the outer periphery of the half-races 7, 8. The balls 5, 6 are uniformly distributed circumferentially by virtue of a cage 14 made of synthetic material.

On the left hand side of FIG. 1, the sealing of the bearing 1 is provided by a conventional type of gasket 15. The gasket 15 in the form of a cartridge is mounted in a frontal radial plane of the bearing 1 between a bore of the outer race 2 and the outer periphery of the inner half-race 7. The gasket 15 comprises, on the side opposite the balls 5, an annular collar 16 equipped with a cylindrical portion 16a and a radial portion 16b and, on the side of the balls 5, an annular collar 17 likewise equipped with a cylindrical portion 17a and a radial portion 17b. On the radial portion 17b is mounted a sealing ring 18 made of synthetic material or of flexible rubber exhibiting a sealing lip 19 which comes into contact with the inner face of the radial portion 16b, the core of the sealing ring 18 being held in frictional contact with the cylindrical portion 16a by virtue of the existence of an annular helical spring 20.

This gasket structure 15 is entirely conventional. It prevents dust and projected particles from penetrating inside the bearing 1 from the left hand side of FIG. 1 between the outer race 2 and the inner half-race 7. This structure also prevents grease contained in the bearing mechanism from leaving.

On the right hand side in relation to FIG. 1, there is mounted between the outer race 2 and the inner half-race 8, substantially in a frontal radial plane of the bearing 1, a conductive cartridge designated 21 in its entirety and which exhibits overall an analogous structure to that of the gasket 15. The conductive cartridge 21 therefore has an annular form. The conductive cartridge 21 which is visible in particular in FIG. 3 exhibits an armature 22 which will be termed "inner" in the present description as it is mounted on the inner half-race 8 and an armature 23 which will be termed "outer" as it is mounted on the outer race 2 of the bearing 1.

The inner armature 22 is equipped with a cylindrical portion 22a which is in contact with the outer cylindrical surface of the inner half-race 8 and a radial portion 22b which therefore exhibits the form of a collar at right angles to the cylindrical portion 22a. The radial collar 22b extends from the inner half-race 8 to close to the bore of the outer race 2 by allowing a clearance between itself and the outer armature 23 to remain. The outer armature 23 likewise possesses a cylindrical portion 23a in contact this time with the bore of the outer race 2 and a radial collar 23b which extends from the bore of the outer race 2 to a substantially median position between the outer race 2 and the outer half-race 8. The bore of the radial collar 23b carries an annular sealing ring 24 which is over-moulded on the armature 23 and constructed, for example, from a synthetic material made of rubber or of an analogous material. The sealing ring 24 exhibits a flexible sealing lip 25 directed towards the outside and held in frictional contact on the face of the radial collar 22b situated on the side of the balls 6. The sealing ring 24 is furthermore in frictional contact by its core against the cylindrical portion 22a under the action of an annular helical spring 26.

It is understood that under these conditions the conductive cartridge 21 constitutes a gasket of analogous structure to the gasket 15. The conductive cartridge 21 of the rolling bearing according to the invention also constitutes, however, a means for transmitting electrical current.

For this purpose a crinkle washer 27 visible by development in FIG. 4, is held in contact with the face of the radial collar 23b which is directed towards the outside of the rolling bearing 1. One of the peaks of the undulations of the collar 27 is fixed to the radial collar 23b by a spot weld 28 in such a manner as to rotationally immobilize the washer 27 in relation to the outer armature 23. A conductive ring 29, for example constructed from carbon is pressed axially and elastically by the undulated collar 27 against the face of the radial collar 22b directed towards the balls 6. The armature 22 exhibits, at one place on its periphery, a blade terminal 30 folded over towards the inside. The armature 23 likewise comprises, at one place on its periphery, a blade terminal 31 which is in its case folded over towards the outside. The two blade terminals 30, 31 may be produced by a cutting out operation and they permit soldering or crimping of conductive leads for the input and the output of the electrical current.

As may be seen in FIG. 3, a clearance remains between the outer periphery of the radial collar 22b and the cylindrical portion 23a of the armature 23. Under these conditions, when the rolling bearing 1 is mounted between two mechanical components which are in relative rotation, the two inner half-races 7, 8 being rotationally driven for example, while the outer race 2 is fixed, the inner armature 22 is likewise rotationally driven by the inner half-race 8, while the outer armature 23 remains immobilized with the outer race 2.

The electrical insulation of the rotating electrical contacts and of the rolling bearing in relation to the mechanical components which rotate may be carried out in various ways.

In a first embodiment, the balls 5 and 6, in the same way as the outer race 2 and the inner half-races 7, 8, are constructed from an electrically conductive material, for example from steel. The conductive cartridge 21 must then be electrically insulated in relation to the outer race 2 and the inner half-race 8. This may be carried out by providing a coating, not illustrated in the figures, of an insulating material such as a layer of ceramic, rubber or the like on the surfaces in contact. Such an insulating coating could thus be provided at 2b in the bore portion of the outer race 2 and at 8b on the cylindrical surface portion of the inner half-race 8 which are in respective contact with the cylindrical portions 23a and 22a of the armatures 23 and 22 of the conductive cartridge 21. As a variant, by contrast this insulating coating may be provided on the surfaces of the cylindrical portions 23a and 22a in respective contact with the outer race 2 and the inner half-race 8. The input and the output of the electrical current in the cartridge 21 is brought about by means of the connection blade terminals 30 and 31.

In another embodiment, the rolling bearing 1 may comprise certain electrically non-conductive elements. Thus the races 2, 7 and 8 and/or the balls 5, 6 may be constructed from ceramic or coated with ceramic in certain applications, for example applications requiring high temperature resistance. Whatever the application, it may also be advantageous to utilize balls 5, 6 made of ceramic or coated with ceramic in combination with conventional type races 2, 7, 8 constructed from an electrically conductive material and in particular from steel in order to facilitate the electrical insulation between the races of the rolling bearing.

In this case, it is no longer necessary to insulate the conductive cartridge 21 in relation to the races 2 and 8 of the bearing mechanism. It is sufficient to provide a layer 2a of insulating material on the outer cylindrical surface of the outer race 2 in the bore of the inner half-races 7, 8 (at 7a and 8a) and, optionally, on the faces of the said races. When the rolling bearing 1 is mounted between two mechanical components which are in relative rotation, the coating of insulating material provides the electrical insulation of the rolling bearing 1. Given that the balls 5, 6 do not conduct electricity, the conductive cartridge 21 may be placed in direct contact with the outer race 2 and the inner half-race 8 without interposition of any insulating layer. The input and the output of the electrical current is brought about by means of the blade terminals 30, 31.

In a variant of this embodiment with non-conductive rolling elements, the input and the output of the electrical current is brought about directly by means of the outer race 2 and the inner race half-race 8, it being possible for the said races, depending on the applications, to be insulated or not in relation to the said races, depending on the applications, to be insulated or not in relation to the surrounding components in contact with the races. In this case the blade terminals 30, 31 may be removed.

The embodiment illustrated in FIGS. 5 and 6 is differentiated from the embodiment illustrated in FIGS. 3 and 4 by the structure of the electrically conductive element. Apart from this difference, the conductive cartridge 21 exhibits the same structure and the identical parts carry the same designations in FIGS. 5 and 6. In this embodiment, the conductive elastic element is no longer constituted by the crinkle washer 27 but by a ring 32 inserted into the bore of the cylindrical portion 23a of the armature 23 and which exhibits a plurality of elastic teeth 33 directed towards the inside and serving as support for a conductive ring 34, for example made of carbon, held in contact against the face of the radial collar 22b situated on the side of the balls 6. In order to provide such an elastic contact, the teeth 33 are radially inclined away from the balls 6 in such a manner as to exert an axial thrust on the ring 34. The end of the elastic pads 33 comprises a rim 35 which holds the conductive ring 34 towards the inside.

In the variant illustrated in the figure, the conductive cartridge 21 does not comprise the blade terminals 30 and 31 visible in FIG. 3, the input and the output of the current being brought about directly by the outer race 2 and the inner half-race 8. The electrical insulation of the rotating contact is provided as it was indicated previously for the embodiment illustrated in FIGS. 1 to 4.

Although the description has been made based on an example relating to a ball bearing having a double row of balls in oblique contact, it will be understood that the invention can be applied to all types of bearings such as ball bearings with a single row of balls, roller bearings, thrust bearings etc. Moreover, although in the example illustrated a conductive cartridge has been provided only on one side of the rolling bearing by leaving a conventional sealing ring on the other side, it will be understood that a conductive cartridge can be provided on each side of the bearing.

The conductive element, which has been described in the illustrated examples in the form of an annular ring pressed axially on one of the armatures of the conductive cartridge, could be replaced by a plurality of conductive segments. The contact force could moreover be exerted radially by conforming the armature in an appropriate manner, instead of being exerted axially.

Finally, it will be noted that the conductive cartridge could be mounted between the races of the bearing in a radial plane distinct from the frontal radial plane in which it is mounted in the attached drawings.

We claim:

1. Rolling bearing with rotating electrical contacts comprising inner and outer races between which are disposed rolling elements and at least one conductive cartridge of generally annular form being mounted between the races of the bearing in a radial plane of the bearing, in such a manner as to permit the passage of an electrical current between two components, one of which is rotationally movable in relation to the other, characterized in that said cartridge comprises two conductive armatures, one being able to rotate in relation to the other, each armature being integral with a respective one of the races of the bearing and at least one conductive element being pressed against one of the armatures by at least one conductive elastic element in contact with the other armature.

2. Rolling bearing according to claim 1, characterized in that the conductive element is constituted by a ring or segments made of carbon.

3. Rolling bearing according to claim 1, characterized in that the conductive elastic element is fixed to the armature with which it is in contact.

4. Rolling bearing according to claim 1, characterized in that the elastic element is constituted by a crinkle washer.

5. Rolling bearing according to claim 1, characterized in that the elastic element is constituted by a ring equipped with elastic support teeth for the conductive element.

6. Rolling bearing according to claim 1, characterized in that the armatures also serve as a support and a seating for a frictional sealing ring, insulating the rolling bearing from an external medium.

7. Rolling bearing according to claim 1, characterized in that the armatures each comprise at least one connection means for the input or the output of the electrical current.

8. Rolling bearing according to claim 1, characterized in that the armatures each comprise at least one blade terminal obtained by a cutting out operation and permitting connection with conductive leads.

9. Rolling bearing according to claim 7, characterized in that the races of the bearing and the rolling elements are constructed from an electrically conductive material, electrical insulation means being interposed between the armatures of the conductive cartridge and the races of the bearing, the input and the output of the electrical current being brought about by the blade terminals.

10. Rolling bearing according to claim 7, characterized in that a layer of insulating material is provided on the surfaces of the armatures or of the races of the bearing which are in respective contact.

11. Rolling bearing according to claim 1, characterized in that the races and/or the rolling elements are constructed in such a manner as not to conduct electricity, the conductive cartridge being in direct contact with the races of the bearing.

12. Rolling bearing according to claim 1, characterized in that the rolling elements are constructed in such a manner as not to conduct electricity, the races themselves being electrically conductive and a layer of insulating material being provided on the outer surface of the outer race and in the bore of the inner race the conductive cartridge being in direct contact with the two aforementioned races, the input and the output of the electrical current being brought about by the abovementioned blade terminals on the respective armatures.

13. Rolling bearing according to claim 1, characterized in that the rolling elements are constructed in such a manner as not to conduct electricity, the races of the bearing themselves being electrically conductive and the conductive cartridge being in direct contact with the two races of the bearing, the input and the output of the electrical current being brought about by the races of the bearing.

* * * * *